United States Patent [19]

Copeland

[11] Patent Number: 5,248,173
[45] Date of Patent: Sep. 28, 1993

[54] PIPE JOINT ASSEMBLY

[75] Inventor: James R. Copeland, Melrose Park, Ill.

[73] Assignee: Chevron Research and Technology Company, San Francisco, Calif.

[21] Appl. No.: 812,237

[22] Filed: Dec. 19, 1991

[51] Int. Cl.⁵ .............................................. F16L 21/02
[52] U.S. Cl. .................................. 285/293; 285/915; 285/296
[58] Field of Search .............. 285/293, 915, 296, 161, 285/179, 187, 919

[56] References Cited

U.S. PATENT DOCUMENTS

| | | | |
|---|---|---|---|
| 1,775,459 | 9/1930 | Herrmann | 285/296 |
| 1,960,249 | 5/1934 | Mano | 285/296 |
| 2,278,447 | 4/1942 | Hyde | 285/296 |
| 2,589,876 | 3/1952 | Sesner | 285/295 |
| 2,661,500 | 12/1953 | Seymour | 285/295 |
| 3,784,235 | 1/1974 | Kessler et al. | 285/915 |
| 3,909,045 | 9/1975 | Meagher | 285/915 |
| 3,937,641 | 2/1976 | Kushner et al. | 285/915 |
| 4,804,209 | 2/1989 | Fischer | 285/915 |
| 5,015,015 | 5/1991 | Fetters | 285/179 |
| 5,064,223 | 11/1991 | Gross | 285/187 |

OTHER PUBLICATIONS

Aero Rubber Company, Inc. brochure.
Hart & Cooley "Ultravent Locking Clips" brochure, Oct. 1989.

*Primary Examiner*—Eric K. Nicholson
*Attorney, Agent, or Firm*—R. J. Sheridan

[57] ABSTRACT

Disclosed is a pipe joint assembly comprising: a first and second pipe having smooth, essentially cylindrical ends; an elastomeric tape which is essentially triangular in cross-section, said tape having two surfaces, one of which is flat and the other of which tapers downward from its center to the edges of the tape; said elastomeric tape being wrapped around said first pipe adjacent one end of said first pipe with said flat surface of said tape being in contact with the outer surface of said first pipe; said first pipe having an outside diameter such that said first pipe fits matingly into one end of said second pipe with the elastomeric tape in contact with both the outer surface of said first pipe and the inner surface of said second pipe.

9 Claims, 2 Drawing Sheets

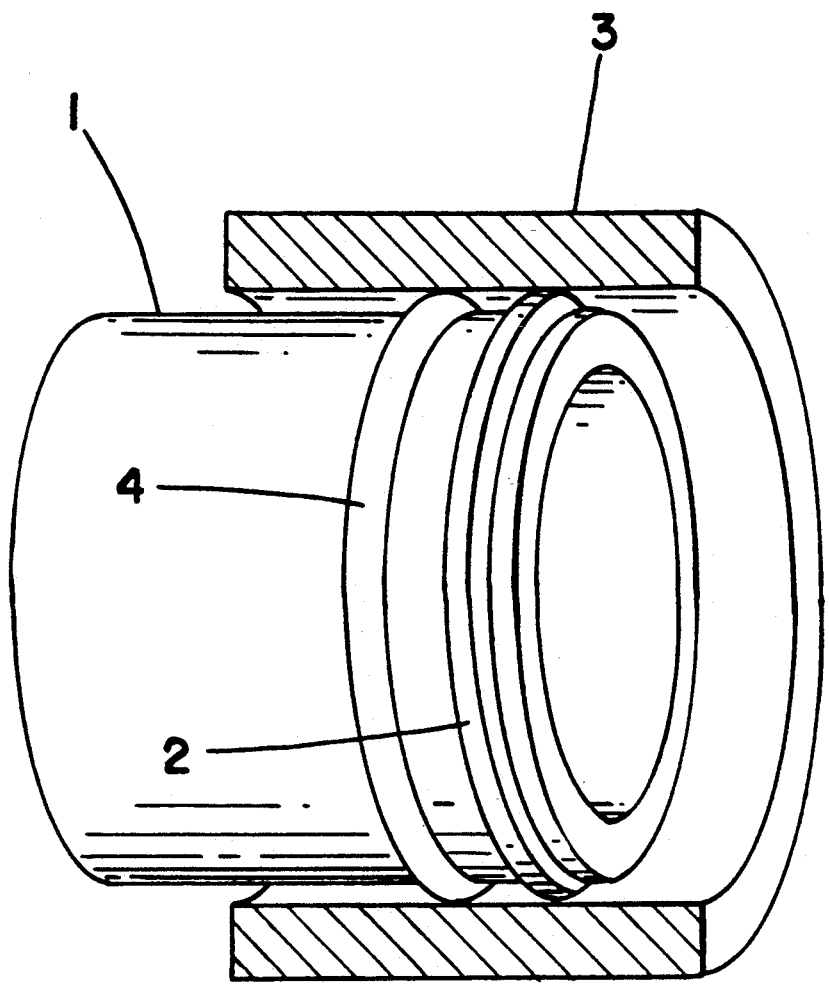
FIG_1

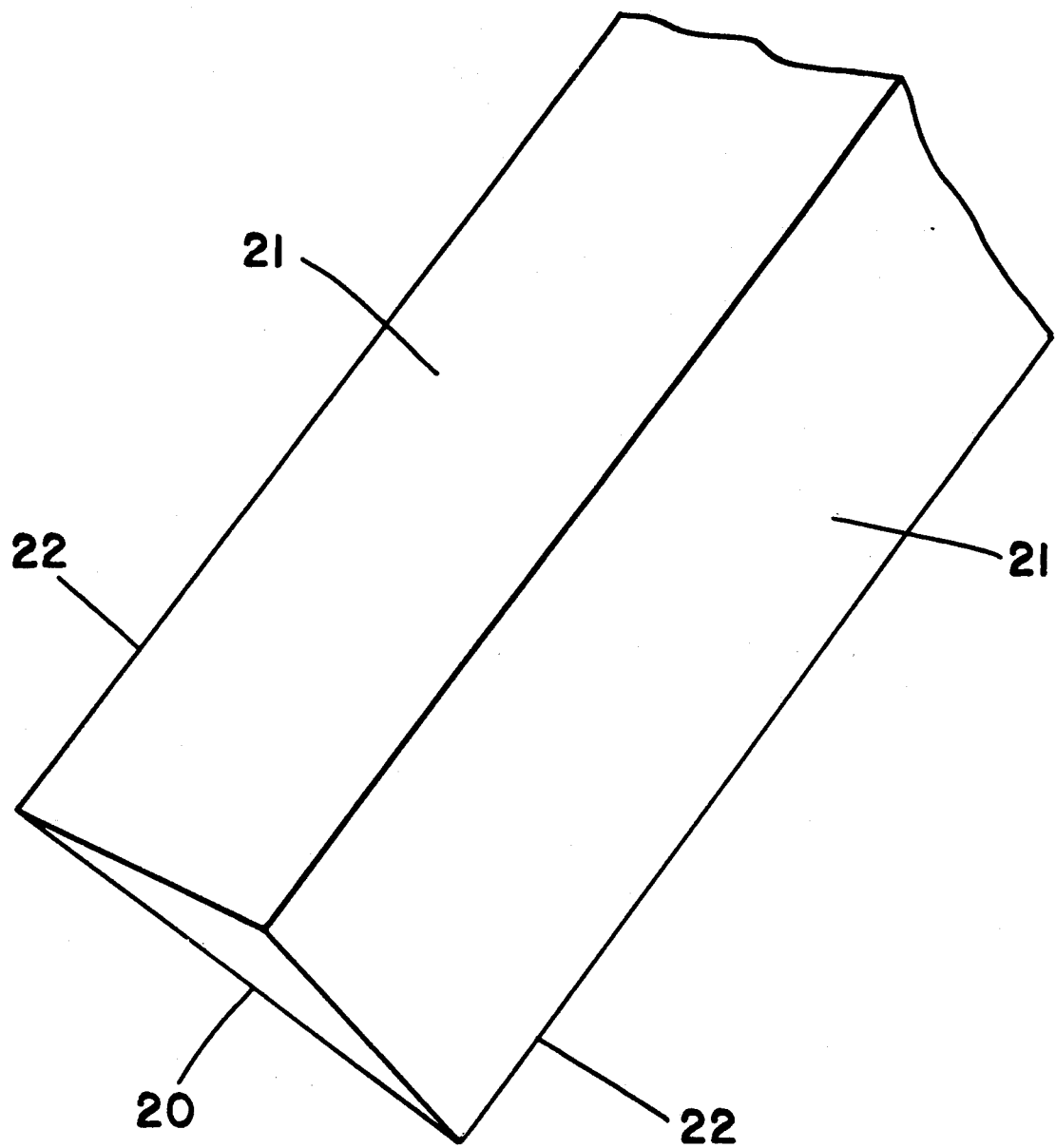
FIG_2

5,248,173

PIPE JOINT ASSEMBLY

BACKGROUND OF THE INVENTION

The present invention is related to pipe assemblies, e.g., vent or flue systems for gas-fired appliances such as furnaces.

One system which is currently used for flues or vents for gas-fired appliances (such as furnaces) utilizes a series of unthreaded essentially cylindrical pipes and fittings (tees, elbows, etc.) made from high temperature resistant resins. When these systems are assembled, it is essential that there be a leak-proof seal at each joint so that the products travelling through the vent or flue (such as Hcl, $H_2SO_4$ and $HNO_3$) do not escape from the vent or flue until they reach the end of the vent or flue. Since the flue or vent is assembled by merely inserting a male end of, e.g., a pipe into a female end of, e.g., a fitting (i.e., there are no threads or other mechanical means to hold the joint together), providing a leak-free seal at each joint can be a problem.

The problem of providing a leak-proof seal has been addressed by applying a bead of sealant to the outer surface of the female portion of the joint assembly prior to inserting it into the male portion of the assembly. After the sealant cures, it seals the joint and provides the desired leak-proof properties.

One serious problem with sealing the vent or flue system using only a sealant is that the sealant does not cure rapidly, and, in fact, can be rather slippery until it cures. As the various pieces of the flue or vent are assembled, joints which have already been assembled can slip or move because the sealant has not yet cured. This can result in a loss of integrity of the seals in the joints already assembled.

One answer to the problem of joint slippage is to immobilize the joint until the sealant cures enough to form a tight seal. This can, of course, be done by manually holding each joint together until the sealant cures. However, since the curing time for typical sealants is several hours, this solution to the slippage problem is impractical at best.

Thus, there has existed a need for a way to conveniently hold the joints of the flue or vent system immobile as the flue or vent is being assembled so that the sealant can cure without adversely affecting the seal.

One proposed method for holding the flue or vent joints while the flue or vent is being assembled is to fasten a barbed metal clip over the end of the male portion of the joint so that, when the joint is assembled, the barbs grip the outer surface of the male portion and the inner surface of the female portion of the joint. While these metal clips do provide some added stability to the joint, they suffer from several serious drawbacks.

First, the barbed clips are hard and sharp and often scratch the pipes' surfaces as well as putting the pipe under stress at the points of contact between the pipes and clips. This can lead to fracturing of the pipe, a clearly undesirable result in a system which is supposed to be leak-free.

Secondly, the metal clips are subject to corrosion by the products carried by the flue or vent, such as Hcl, $H_2SO_4$ and/or $HNO_3$. This corrosion can lead to long term failure of the clip and joint.

Another disadvantage of the barbed metal clips is that generally they are thicker than the space between the outer surface of the male portion and the inner surface of the female portion of the joint. Thus, as the metal clip is forced between the male and female portions of the joint, the pipes are deformed and a gap forms between the pipes where each clip is attached. This is obviously undesirable if a leak-proof joint is to be achieved.

It has now been found that if an elastomeric tape having the configuration described herein is applied to the male portion of the joint prior to assembly, the resulting joint is stabilized against movement without otherwise adversely affecting the joint seal. Thus, the sealant is allowed to cure without having the joint shift or slip.

Among other factors, the present invention is based upon the discovery that when an elastomeric tape, as described herein, is used in a pipe joint assembly, the resulting assembly is stabilized against movement. Furthermore, it has been discovered that the strength of the resulting joint is improved significantly over previous joint assemblies. Also, the elastomeric tape provides a sealing means in the joint assembly.

SUMMARY OF THE INVENTION

There is provided in accordance with the present invention a pipe joint assembly comprising:
A. a first and second pipe having smooth, essentially cylindrical ends;
B. an elastomeric tape which is essentially triangular in cross-section, said tape having two surfaces, one of which is flat and the other of which tapers downward from its center to the edges of the tape;
C. said elastomeric tape being wrapped around said first pipe adjacent one end of said first pipe with said flat surface of said tape being in contact with the outer surface of said first pipe;
D. said first pipe having an outside diameter such that said first pipe fits matingly into one end of said second pipe with the elastomeric tape in contact with both the outer surface of said first pipe and the inner surface of said second pipe.

BRIEF DESCRIPTION OF THE DRAWINGS

FIG. 1 shows a partially assembled pipe joint assembly of the present invention.

FIG. 2 shows a cross section view of the elastomeric tape used in the pipe joint assemblies of the present invention.

DETAILED DESCRIPTION OF PREFERRED EMBODIMENTS

The pipe assemblies of the present invention are useful for a variety of purposes where it is important that the joints of the assembly be leak-proof. One common use of the pipe assemblies of this invention is as a flue or vent for appliances, such as furnaces, which give off exhaust gases which must be vented to the atmosphere. For the sake of brevity and clarity, the pipe assemblies of this invention will be described in terms of flues or vents, it being understood, however, that such description is not intended to limit the scope of the present invention.

At the outset, it should be noted that, as used herein, the term "pipe" refers not only to the elongated, essentially cylindrical structures used in flue or vent systems, but also the fittings and couplings, such as tees, elbows and the like, used to join, branch, turn or terminate the flue or vent assembly.

The pipes used in making the pipe assemblies of the present invention may be made from a variety of materials. Typically, they will be made from a resinous material, although other materials such as metals can be used in applications, such as at low temperatures, where the metal will not have a deleterious effect on the joints formed in the assembly. In a preferred embodiment, the pipe assembly is made from a resin which is resistant to the high temperatures, e.g., up to about 480° F., typically encountered in the exhaust systems of high efficiency gas appliances. These resinous materials are preferred because of their resistance to corrosion by the exhaust products from the gas appliance. Examples of these resins include, but are not limited to, ULTEM engineering plastics based on polyetherimide resins (sold by General Electric Company, Polymer Product Dept.), ABS resin and poly(vinyl chloride) resin, with ULTEM 1000 resin being particularly preferred.

The tape used in the pipe assemblies of the present invention is made from an elastomeric material. This allows the tape to be stretched if necessary, to form a snug fit around the pipe. Also, it allows the tape to be compressed between the pipes which are fitted together to form the leak-proof joint, thereby increasing the stability of the joint as well as helping to seal it.

A particularly preferred material for the elastomeric tape is silicone rubber. It is particularly advantageous because it stretches freely, and forms a good seal with the surfaces of the pipe. Also, it does not adhere to the pipe surface, but does adhere somewhat to itself. This means that the tape can be removed from the pipe and repositioned, if necessary, during assembly, but will stay in placed if the ends of the tape are overlapped slightly and pressed together.

The configuration of the elastomeric tape is critical to the present invention. Referring to FIG. 2, the tape has an essentially triangular cross-section, i.e., the tape is thicker at its center than it is at its edges. It has a first, flat surface 20 and a second tapered or beveled surface 21. Tapered surface 21 is raised at its center and tapers downward to the edges 22 of the tape. It has been found that this tape configuration allows for ease of assembly while also providing excellent stability to the joint. In addition, the raised center of the tape provides sealing of the joint.

The sealant used in the pipe assemblies of the present invention may be any sealant which adheres to the surfaces of the pipes, provides a satisfactory seal when cured and can withstand the conditions, e.g. heat and corrosion, to which it will be subjected. Preferred sealants are the silicone rubber sealants, such as RTV 736 silicone adhesive sold by Dow Corning.

In general, the pipe assemblies of the present invention are assembled by inserting a pipe (i.e., the male portion of the assembly) which has the elastomeric tape and sealant applied to it into another pipe or fitting (i.e, the female portion of the assembly).

Referring to FIG. 1, elastomeric tape 2 is applied to the male portion of the assembly 1 adjacent its end, with the flat surface of the elastomeric tape in contact with the outer surface of male portion 1. In a preferred embodiment, elastomeric tape 2 is applied so that one edge is aligned or flush with the end of male portion 1.

Typically, the clearance between the outer surface of male portion 1 and the inner surface of the female portion 3 of the assembly will be on the order of about 0.010 inch. The elastomeric tape will typically have a thickness at its thickest point (i.e., at its center) of about 0.040 inch. Thus, in a preferred embodiment, the piece of elastomeric tape which is applied to male portion 1 of the assembly is substantially shorter than the circumference of male portion 1, and the elastomeric tape is stretched as it is applied so that it wraps completely around male portion 1. This stretching of the elastomeric tape accomplishes two things. First, it makes the tape thinner and, therefore, allows it to fit easily yet snugly into the clearance between male portion 1 and female portion 3 of the assembly. Secondly, it puts the tape under tension, which helps hold it in place.

After elastomeric tape 2 has been wrapped around male portion 1, the ends of the tape are overlapped slightly and pressed together. Since the elastomeric tape adheres to itself, this will hold the tape in place.

Once the tape has been applied to male portion 1, a bead of sealant 4 is applied to the outer surface of male portion 1 adjacent elastomeric tape 2. In a preferred embodiment, sealant 4 is applied so that it is immediately adjacent the trailing edge of elastomeric tape 2. More preferably, sealant 4 is applied so that it overlaps slightly with the trailing edge of elastomeric tape 2.

Once the sealant has been applied, male portion 1 is inserted into female portion 3. Preferably this is done without twisting either male portion 1 or female portion 3. Any excess sealant can then be removed.

EXAMPLES 1-8

Pipe assemblies of the present invention were made using 3 inch and 4 inch diameter pipes and fittings made of ULTEM 1000 resin (wall thickness about 0.058 inch). A silicone rubber tape having the configuration described above (available from Aero Rubber Company, Inc.) was applied to the outer surface of the male portion of the assembly with the flat surface of the tape contacting the outer surface of the male portion. One edge (the "leading edge") of the tape was aligned with the end of the pipe. In the pipe assemblies made from 3 inch diameter pipe, the tape was 3½ inches long, and in the assemblies made from 4 inch diameter pipe the tape was 4½ inches long. The tape was stretched as it was applied so that it contacted the entire circumference of the pipe with the tape ends overlapping slightly. The tape ends were then pressed together.

A bead of RTV 736 silicone adhesive was then applied circumferentially to the outer surface of the male portion of the assembly next to the "trailing" edge of the tape.

The male portion of the assembly was then inserted into the female portion of the assembly and any excess silicone adhesive was removed.

The thus-produced pipe assemblies were tested for leaks and for tensile pull strength after 2 minutes and after 24 hours. The leak test was conducted by sealing the assembly and pressurizing it with water. The results of the leak and tensile pull tests are indicated in Table I below.

TABLE 1

| Ex. No. | 2 MIN. LEAK TEST | 2 MIN TENSILE PULL | 24 HOUR LEAK TEST | 24 HOUR TENSILE PULL |
|---|---|---|---|---|
| 4 INCH PIPE (& FITTING) | | | | |
| 1 (SWEEP 90 DEG ELL) | | | | |
| A. | FAILED | 88 LBS. | PASSED | 480 LBS. |
| B. | PASSED | 100 LBS. | PASSED | 356 LBS. |
| C. | FAILED | 94 LBS. | PASSED | 382 LBS. |
| D. | FAILED | 112 LBS. | PASSED | 396 LBS. |

TABLE I-continued

| Ex. No. | | 2 MIN. LEAK TEST | 2 MIN TENSILE PULL | 24 HOUR LEAK TEST | 24 HOUR TENSILE PULL |
|---|---|---|---|---|---|
| 2 | E. (SWEEP 45 DEG ELL) | FAILED | 126 LBS. | PASSED | 340 LBS. |
|  | A. | PASSED | 80 LBS. | PASSED | 400 LBS. |
|  | B. | FAILED | 76 LBS. | PASSED | 344 LBS. |
|  | C. | PASSED | 88 LBS. | PASSED | 446 LBS. |
|  | D. | PASSED | 80 LBS. | PASSED | 456 LBS. |
|  | E. | FAILED | 64 LBS. | PASSED | 398 LBS. |
| 3 | (STRAIGHT COUPLING) | | | | |
|  | A. | PASSED | 58 LBS. | PASSED | 336 LBS. |
|  | B. | PASSED | 68 LBS. | PASSED | 310 LBS. |
|  | C. | FAILED | 92 LBS. | PASSED | 328 LBS. |
|  | D. | FAILED | 122 LBS. | PASSED | 336 LBS. |
|  | E. | FAILED | 64 LBS. | PASSED | 312 LBS. |
| 4 | (TEE) | | | | |
|  | A. | PASSED | 112 LBS. | PASSED | 562 LBS. |
|  | B. | FAILED | 158 LBS. | PASSED | 474 LBS. |
|  | C. | FAILED | 108 LBS. | PASSED | 508 LBS. |
|  | D. | FAILED | 88 LBS. | PASSED | 498 LBS. |
|  | E. | FAILED | 158 LBS. | PASSED | 542 LBS. |
|  | 3 INCH PIPE (& FITTING) | | | | |
| 5 | (SWEEP 90 DEG ELL) | | | | |
|  | A. | PASSED | 72 LBS. | PASSED | 278 LBS. |
|  | B. | PASSED | 74 LBS. | PASSED | 368 LBS. |
|  | C. | PASSED | 94 LBS. | PASSED | 356 LBS. |
|  | D. | PASSED | 30 LBS. | PASSED | 346 LBS. |
|  | E. | PASSED | 62 LBS. | PASSED | 284 LBS. |
| 6 | (SWEEP 45 DEG ELL) | | | | |
|  | A. | FAILED | 98 LBS. | PASSED | 330 LBS. |
|  | B. | FAILED | 92 LBS. | — | — |
|  | C. | FAILED | 124 LBS. | PASSED | 338 LBS. |
|  | D. | FAILED | 110 LBS. | PASSED | 316 LBS. |
|  | E. | FAILED | 138 LBS. | PASSED | 364 LBS. |
|  |  |  | 140 LBS. | PASSED | 294 LBS. |
| 7 | (STRAIGHT COUPLING) | | | | |
|  | A. | PASSED | 116 LBS. | PASSED | 276 LBS. |
|  | B. | PASSED | 146 LBS. | PASSED | 304 LBS. |
|  | C. | PASSED | 102 LBS. | PASSED | 274 LBS. |
|  | D. | PASSED | 152 LBS. | PASSED | 258 LBS. |
|  | E. | PASSED | 104 LBS. | PASSED | 244 LBS. |
| 8 | (TEE) | | | | |
|  | A. | PASSED | 136 LBS. | PASSED | 284 LBS. |
|  | B. | PASSED | 152 LBS. | PASSED | 250 LBS. |
|  | C. | PASSED | 128 LBS. | PASSED | 260 LBS. |
|  | D. | PASSED | 128 LBS. | PASSED | 254 LBS. |
|  | E. | PASSED | 106 LBS. | PASSED | 228 LBS. |

The results in Table I above demonstrate that the pipe assemblies of the present invention have excellent tensile pull strength after only 2 minutes following assembly, i.e., prior to cure of the sealant. After the sealant cures, i.e., after 24 hours, the tensile pull strength of the assemblies increases several fold to the figures shown in Table I.

Table I also shows the results of the leak tests performed on the pipe assemblies. The results of the leak test performed 2 minutes after assembly of the pipe joint are indicated in Table I. However, since this test was performed before the sealant had cured, it was expected that leaks would occur. Therefore, failure of the 2 minute leak test is not considered significant.

The more significant leak test is that performed after 24 hours. At that point the sealant should be fully cured and the assembly should be leak-free. As indicated by Table I, all of the pipe assemblies of the present invention passed the 24 hour leak test.

COMPARATIVE EXAMPLE A

A pipe assembly was made from a 3 inch diameter pipe and fitting as described in Example 1-5, but without using the silicone rubber tape (i.e., using only the silicone adhesive). After 2 minutes, the joint had a tensile pull strength of only 2 pounds. After the silicone adhesive had fully cured, the tensile pull strength of the joint was 270 pounds.

COMPARATIVE EXAMPLE B

A pipe assembly was made as described in Examples 1-5, but without the silicone rubber tape. Instead, barbed metal clips were slipped over the end of the male portion of the pipe assembly, the sealant was applied, and the male inserted into the female part of the assembly. After 2 minutes, the pipe assembly had a tensile pull strength of only 18 pounds. After the sealant had fully cured, the tensile pull strength had increased to only 170 pounds. In addition, the joint leaked.

When the tensile pull strengths of Comparative Examples A and B are compared to those achieved by the present invention (see Table I), it is clear that the pipe joint assemblies of the present invention are superior to those made with sealant only, or with the combination of sealant and barbed metal clips, especially at the critical in the assembly of the pipe, i.e., shortly after the joint is assembled while the sealant is not yet cured.

What is claimed is:

1. A pipe joint assembly comprising:
   A. a first and second pipe having smooth, essentially cylindrical ends;
   B. an elastomeric tape which is essentially triangular in cross-section, said tape having three surfaces, one of which is flat and the other two of which taper downward from the center of the tape to the edges of the tape;
   C. said elastomeric tape being wrapped around said first pipe adjacent one end of said first pipe with said flat surface of said tape being in contact with the outer surface of said first pipe;
   C. said first pipe having an outside diameter such that said first pipe fits matingly into one end of said second pipe with the elastomeric tape in contact with both the outer surface of said first pipe and the inner surface of said second pipe.

2. The pipe joint assembly of claim 1 further comprising a sealant which fills any space between the outer surface of said first pipe and the inner surface of said second pipe.

3. The pipe joint assembly of claim 1 wherein the first and second pipe are made of a resin selected from the group consisting of a polyetherimide resin, ABS resin and poly (vinyl chloride).

4. The pipe joint assembly of claim 3 wherein the first and second pipe are made of a polyetherimide resin.

5. The pipe joint assembly of claim 1 wherein the elastomeric tape is a silicone rubber tape.

6. The pipe joint assembly of claim 2 wherein the sealant is a silicone rubber sealant.

7. The pipe joint assembly of claim 1 wherein the elastomeric tape is located such that one edge of said tape is aligned with the end of said first pipe and essentially all of said flat surface of the tape is in contact with the outer surface of said first pipe.

8. The pipe joint assembly of claim 7 further comprising a sealant which fills any space between the outer surface of said first pipe and the inner surface of said second pipe, and said elastomeric tape is located between said sealant and the end of said first pipe.

9. The pipe joint assembly of claim 8 wherein said sealant is located immediately adjacent said elastomeric tape.

* * * * *